(12) United States Patent
Riel et al.

(10) Patent No.: US 7,277,053 B2
(45) Date of Patent: Oct. 2, 2007

(54) APPARATUS AND METHODS FOR DETECTING AND LOCATING SIGNALS

(75) Inventors: Ryan David Riel, Boulder, CO (US); Adam Ethan Calihman, Boulder, CO (US)

(73) Assignee: Lucid Dimensions, LLC, Boulder, CO (US)

( * ) Notice: Subject to any disclaimer, the term of this patent is extended or adjusted under 35 U.S.C. 154(b) by 268 days.

(21) Appl. No.: 10/936,428

(22) Filed: Sep. 8, 2004

(65) Prior Publication Data

US 2006/0049985 A1    Mar. 9, 2006

(51) Int. Cl.
*G01S 5/04* (2006.01)
*G01C 21/00* (2006.01)
*G01D 5/36* (2006.01)

(52) U.S. Cl. .................. 342/432; 701/207; 250/233
(58) Field of Classification Search ................ 342/359, 342/368, 133, 354, 357, 422, 423, 445, 450, 342/438, 426, 403, 406, 121, 154, 742, 432, 342/386, 207.11, 207.15; 33/21.2; 432/121; 340/368.3; 250/233; 701/207; 345/167; 367/72

See application file for complete search history.

(56) References Cited

U.S. PATENT DOCUMENTS

| | | | |
|---|---|---|---|
| 3,232,120 A * | 2/1966 | Ensley | 250/231.12 |
| 4,155,649 A | 5/1979 | Leiboff | |
| 4,203,114 A | 5/1980 | Gerst et al. | |
| 4,836,119 A * | 6/1989 | Siraco et al. | 112/306 |
| 5,568,154 A | 10/1996 | Cohen | |
| 5,774,826 A * | 6/1998 | McBride | 701/207 |
| 5,790,075 A * | 8/1998 | Inugai et al. | 342/359 |
| 5,815,118 A * | 9/1998 | Schipper | 342/451 |
| 5,955,982 A | 9/1999 | Moulin | |
| 6,005,514 A * | 12/1999 | Lightsey | 342/365 |
| 6,166,690 A * | 12/2000 | Lin et al. | 342/383 |
| 6,195,559 B1 * | 2/2001 | Rapeli et al. | 455/500 |
| 6,273,371 B1 * | 8/2001 | Testi | 244/223 |
| 6,390,934 B1 * | 5/2002 | Winfield et al. | 473/351 |
| 6,437,740 B1 * | 8/2002 | De Champlain et al. | 342/417 |
| 7,042,420 B2 * | 5/2006 | Ebling et al. | 343/911 L |
| 7,061,426 B1 * | 6/2006 | Fey et al. | 342/357.08 |
| 2003/0076304 A1 * | 4/2003 | Smyth | 345/167 |
| 2006/0025897 A1 * | 2/2006 | Shostak et al. | 701/1 |
| 2006/0028372 A1 * | 2/2006 | Hansen | 342/25 R |
| 2006/0058946 A1 * | 3/2006 | Chappell | 701/207 |
| 2006/0125680 A1 * | 6/2006 | Thackray | 342/54 |
| 2006/0166681 A1 * | 7/2006 | Lohbihler | 455/456.2 |

* cited by examiner

*Primary Examiner*—Thomas H. Tarcza
*Assistant Examiner*—Hien Ly
(74) *Attorney, Agent, or Firm*—Macheledt Bales & Heidmiller, LLP; Jennifer L. Bales

(57) ABSTRACT

A discrete three-dimensional receiving element has multiple sensors scattered over its surface to detect and locate a signal. The sensors facing the signal detect the signal, and a boundary line is drawn between the sensor which detect the signal and those which don't. The strength of signal may also be detected. A plane is drawn through the receiver element, and the direction of the signal is determined as generally perpendicular to the plane, in the direction of the sensors which are receiving the signal. Distance to the source may also be determined based on signal strength. The location of the signal source may be transmitted to a remote location, or the receiver may direct an electromagnetic beam toward the source to detect further information about the source.

21 Claims, 10 Drawing Sheets

MULTIPLE TARGET SCENARIO

APPARATUS AND METHODS FOR DETECTING AND LOCATING SIGNALS

BACKGROUND OF THE INVENTION

1. Field of the Invention

The present invention is directed to methods and apparatus for detecting and locating signals. More specifically, the present invention is directed to methods and apparatus for detecting and locating signals with a three dimensional receiving element having sensors surrounding its surface.

2. Description of the Related Art

Overall Methods to Locate EM in 3D

Current methods to locate electromagnetic waves in three dimensions rely on intensity, wavelength and phase measurements using planar sensor arrays combined with signal and image processing algorithms. In lower frequency systems, measurements taken by planar sensor arrays are correlated to find the 3D location of electromagnetic wave sources. By measuring the phase shift of waves between sensors, the position of the source can be triangulated. Higher frequency systems in the visible light and infrared range typically use imaging system to determine 3D location of sources. Other systems for 3D location use active EM beams with sensors that measure the reflected waves. This type of system is currently used in LIDAR and radar systems for a vast number of applications.

Radio Frequency Systems

Current methods to locate radio frequency waves rely on a form of triangulation, whether a single directional antennae system or a phased array radar system with multiple antennas and signal processing algorithms. A single antenna typically monitors signal amplitude to find the direction of the desired radio frequency source. This method involves user-operated search patterns susceptible to human error and lengthy search times in emergency or time-critical scenarios. Back-country travelers encountering potentially dangerous avalanche terrain can use radio frequency transceivers in the case of possible burial. These transceivers determine a direction to buried avalanche victims using traditional triangulation techniques. The method to locate buried victims involves a search pattern that increases the time for rescue. Locating buried transmitters involves the use of antennae placed perpendicular to one another and then processing the phase shift of the incoming signals. The most recent embodiment of this application is shown in U.S. Pat. No. 5,955,982. "The first antenna, the second antenna, and the third virtual antenna provide three dimensional vector analysis by the receiver of the predetermined frequency received from the radio transmitter." This method uses a predetermined frequency and monitors phase shift between two antennae to triangulate the signal source. The method susceptible to multi-path errors associated with reflecting waves from the surrounding environment.

In addition to single antennae systems, radar systems employ numerous antennas to monitor values such as wavelength, amplitude, and phase to determine the location of RF reflecting objects. These systems emit sweeps of microwaves on the surrounding area and capture returning signals. Such sweeps typically encounter various mediums that can reflect microwaves. Current systems must subsequently compensate for this multi-path reflection with advanced signal processing algorithms.

Electro-Optic and Infrared Systems

The current state of the art for sensing infrared sources in 3D employs imaging systems to take snapshots of the surrounding area. These imaging systems are limited to a specific field of view (FOV) and incorporate scanning algorithms and image processing techniques for target tracking and identification. The instantaneous FOV of the imaging systems can only observe a small portion of the 3D space at any one time. The drawbacks of conventional imaging systems are detailed in *The Handbook of Infrared Technology*, "with a limited field-of-view system, a large distance is required to view a large area. But then the target becomes very small and may be hard to find. Shorter distances mean that a smaller area is viewed and overall search time is significantly increased." These limitations on contemporary imaging systems cause significant difficulties when monitoring a wide field of regard for infrared sources.

There exists a wide range of systems for detecting and deterring infrared seeking threats. The current state of the art technologies include the LAIRCOM and NEMESIS systems designed by Northrop Grumman, and the DART system by BAE. As discussed on a Northrop Grumman brochure, "the LAIRCOM system uses staring missile warners to detect a launched MANPAD then directs a pointer-tracker, which locks on to the missile in flight, and jams the missile's guidance system with a beam of infrared energy." The missile warners have a wide FOV and are designed for long range detection. The system uses up to six, 120° field of view sensors to view an entire 360° field of regard (FOR). The LAIRCOM system first scans the six missile warners to detect ultra violet UV radiation emanating from missile threats. The missile warners take images of the 120° FOV and then provide guidance to the gimbaled system with a narrow FOV. Using the narrow FOV, the gimbaled system precisely tracks the target for IR beam directing. The beam of infrared energy saturates the infrared sensors on the incoming missile and disables the guidance system. The NEMESIS and DART systems use similar techniques to the LAIRCOM to defeat incoming infrared seeking missiles.

The missile warners are the first components of the system to detect missile threats and can be analyzed to determine the initial time constraints. Some considerations when determining their effectiveness include the wide FOV, lens focus, image processing algorithms, and the need for multiple sensors. The wide 120° FOV samples a very large area for UV sources, therefore a small UV source will become very small in the image plane. In addition, sources which are near the 120° range of the system become obscured on the image plane and must be corrected with image processing algorithms. Complex image processing algorithms must be incorporated to determine the 3D direction of incoming threats. Lensing systems are also subject to a system focus, objects outside the focus of the system will be obscured. A finite time will be necessary to focus the lens system on the object. The current systems use up to six different missile warning systems which must all be analyzed using image processing techniques. The combination of wide FOV, focus time, image processing algorithms, and multiple sensors creates a complex, high-cost system with many components to determine the 3D location of an IR source.

Once the IR source is detected by the missile warning system, the gimbaled system points a narrow FOV imaging system and beam of infrared energy at the incoming MANPAD. The DART system currently has start and stop slew rates of 0.25 seconds, which will amount to at least 0.5 seconds before the target can be locked onto. Additional time is necessary to travel to the angular coordinates of the incoming missile. With a 90 degree per second slew rate, it would take from 0 to 3 seconds to move to various angular coordinates.

Other systems utilize multiple FOV sensors for searching and tracking. These systems use a wide FOV in order to search for IR threats and then a narrow FOV for tracking. Examples of these systems include the Night Hunter II and the RAVEN EYE II by Northrop Grumman, and the POP by IAI. The actuator speed varies depending on the specifications of the system. The Raven Eye II has actuator speeds of up to 60 degrees/sec and a wide FOV of 13.5×13.5 for searching. With these specifications it would take up to 78 seconds to monitor a full 360 degree field of regard for IR sources.

LIDAR Systems

Light Detection and Ranging (LIDAR) systems, or laser radar, function by sending out pulses of light and processing the returning signals. By measuring the time of the photon flight, LIDAR systems spatially derive the surrounding environment. Differential Absorption LIDAR (DIAL) employs similar techniques of LIDAR but also includes a pulse of two discrete wavelengths to identify and measure the concentration of certain gases. Different gases (such as ozone and water vapor) absorb and transmit different wavelengths within the EM spectrum. The relative strength of the returned wavelengths as measured by the detector, determine the specific gas. Gaseous targets are notorious for scattering incoming beams and discouraging accurate analysis. Planar techniques used to acquire the returned signals are prone to multi-path errors resulting from scattering. Unintended reflecting objects will interfere with the analysis of intended objects. These systems are used for a wide range of applications including laser guided missile systems, weather monitoring, toxic cloud analysis, vegetation analysis.

A need remains in the art for improved methods and apparatus for detecting and locating signals.

SUMMARY OF THE INVENTION

An object of the present invention is improved methods and apparatus for detecting and locating signals. A discrete three dimensional receiving element has multiple sensors surrounding the receiving element and detects the signal with those sensors generally facing the signal. The receiver then determines a boundary line around the surface of the receiving element, the boundary line generally separating the sensors that are detecting the signal from the sensors not detecting the signal. Then, a plane through the receiving element is drawn based upon the boundary line. The direction of the signal is determined based upon the plane. The apparatus may also determine the distance to the source of the signal based upon the strength of signal detected at the various sensors. If signal strength is measured, it is also used to more accurately determine the boundary line and plane.

The apparatus may also transmit a second signal, based upon the determined direction and/or distance to the source of the signal. This second signal might be the location of the source, and it could be communicated to a nearby vehicle for guidance, for example. Or, the second signal might be an electromagnetic beam pointed at the source. In this case, something would be determined about the source by the impinging of the beam on the source. For example, an infrared signal might make a "hot spot" on the source, which could be detected by the receiving unit or some other unit. Or, reflection of an EM wave could provide better ranging information.

As a feature, the receiver may have the capacity of rotating while the sensors are detecting the signal. This permits the use of fewer sensors and allows for alignment to the source.

In one preferred embodiment, the receiving unit is spherical and the sensors are placed in bands encircling the receiving unit. One vertical band plus one horizontal band works well. The receiving unit may have other shapes, including sphere, ellipsoid, circular band, cone, prism, pyramid, cone.

Depending on the sensors used, the receiver may detect one of the following types of signals: radio frequency, microwave, infrared, visible light, ultraviolet, x-ray, gamma ray, radar, sonar, sound, particles, communication signals.

The receiver may further detect a second signal based upon regions of detected signal strength. This is done by determining a second boundary planes based on regions of signal strength.

The invention pertains to geometric sensor configurations and methods for use in electromagnetic systems. The invention offers an advanced geometric configuration for electromagnetic wave sensors that eliminates many of the problems associated with planar techniques. The underlying concept of the invention is based upon fundamental properties of radiation transmission and its reception on a spherical surface. Specifically, the technology exploits the principle that a point source of electromagnetic radiation will illuminate one hemisphere of a spherical object, leaving the other side in shadow (similar to the earth/sun system). The significance of this concept lies in the consistent and mathematically predictable position of the illuminated hemisphere relative to the radiating source. Consequently, by monitoring the illuminated hemisphere over the surface of a sphere, the relative 3D position of the point source can be calculated. Harnessing this concept, a spherical receiver can be constructed with strategically placed sensors to determine the position of the illuminated hemisphere and subsequently the three-dimensional location of the source.

The concept of monitoring a hemispherical surface can be designed into both passive (non-rotational) and rotational devices for a variety applications. An active rotational system can be designed with sensor bands that receive specific EM wavelengths associated with different signal sources. The active rotational system has benefits for beam steering, image acquisition, and reduced number of sensors, but will be limited by rotational slew rates. A passive sensor system can also be designed with an entire sphere covered with EM sensors. The passive sensor system has the benefit of no moving parts and multiple target tracking abilities, but requires more sensors and increased signal processing. The method used in monitoring electromagnetic wave systems is also applicable to many other wave propagating systems such as pressure waves, sonar waves, and particle sources. The technology stands to greatly benefit commercial industries involved with detection and sensing systems, astronomical instrumentation, remote sampling and measurement, target tracking and identification, wireless communications, security systems, and navigation systems.

A first embodiment of the invention system and process uses a 3-D insulating object with strategically placed sensors to determine the direction of an electromagnetic source. The sensors on the 3-D object are monitored for receiving status and correlated with other sensors to determine the direction of an EM source. This embodiment of the invention uses a variety of geometrical shapes in combination with the method of monitoring receiving status and correlating between sensors. The method takes advantage of the placement of sensors on geometrical objects to determine a boundary plane between sensors receiving and ones that are not receiving.

A second embodiment uses a passive spherical receiver with strategically placed sensors for locating EM waves in three dimensions. A passive unit can be designed for various applications to provide directions to guidance systems seeking and EM source. The non-rotational method can provide angular turns to a guidance system in order to align the target tracking vector with the EM source. Sensors will be placed strategically on the sphere and correlated to geometrically find the direction of EM sources. The passive device also has abilities to locate multiple sources simultaneously.

A third embodiment incorporates an active rotational system with passive EM sensors. This system incorporates the used of sensor bands with sensors concentrated in critical areas on the bands for precision angular turns. The system can be used to point highly sensitive receivers or imaging systems directly at an EM source. The system can accurately characterize EM sources by taking detailed images of the EM source. The system can also be used for pointing highly tuned wireless communication receivers for accurate data transmission.

A fourth embodiment of the invention is a dual gimbaled spherical receiver with active beam generation and highly tuned receivers or imaging systems for use in a wide variety of applications. This system incorporates sensor bands with sensors concentrated in critical areas on the bands for precision angular turns. The system will emit various EM wavelengths to be reflected from objects in 3D space. The system will then monitor the reflected wavelengths to provide three dimensional location and object characterization. The active sensor system will employ large angle scanning algorithms to search for reflecting objects. After objects are located the system will employ small angle scanning algorithms to characterize the reflecting object.

DETAILED DESCRIPTION OF THE PREFERRED EMBODIMENTS

Figure 1:
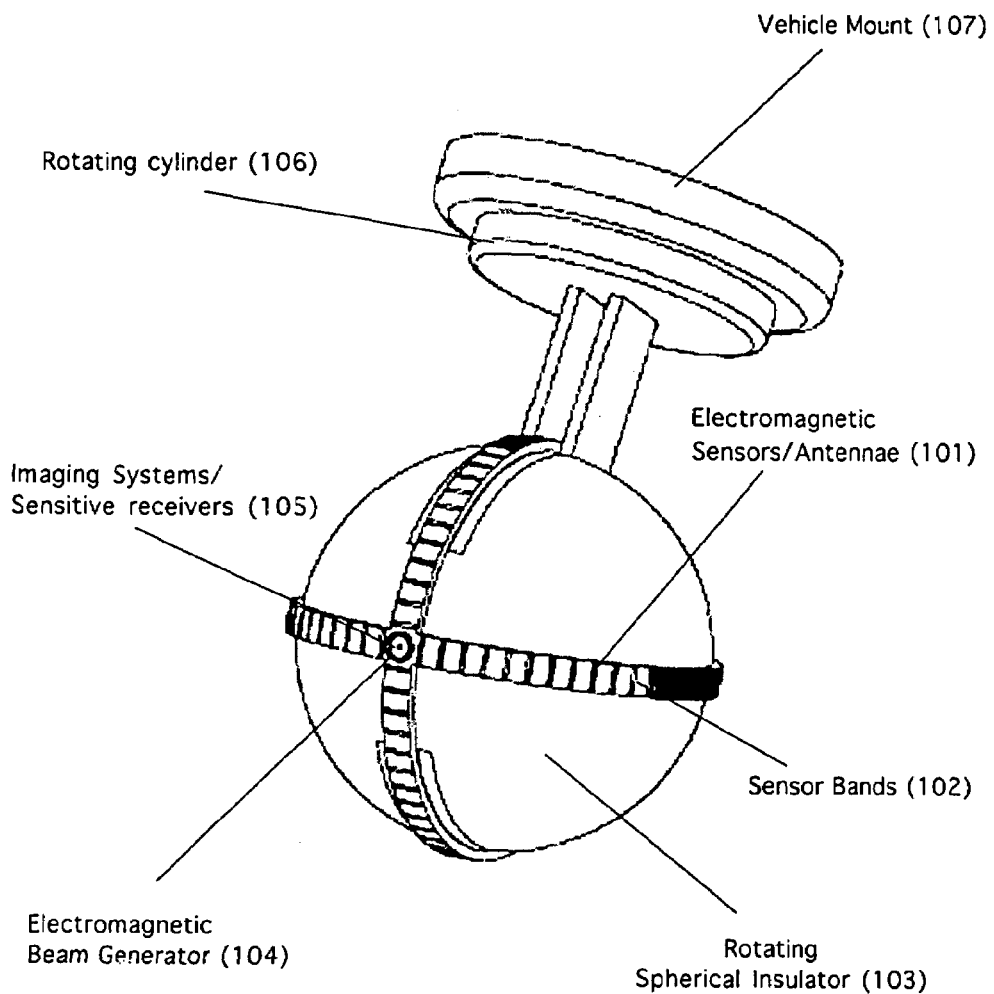
FIG. 1 is a diagram depicting a preferred embodiment of the invention with full rotational system and active electromagnetic beam generating systems.

FIG. 1 shows one embodiment of the invention with electromagnetic sensors/antennae 101 placed on two spherical bands 102 around the rotating spherical insulator 103. The current rotational system uses an actuator driven rotating cylinder 6 and internal axis through the spherical insulator 103. The invention also uses a combination of beam generating technologies 104 as well as imaging technologies and sensitive receivers 105 strategically placed on the sphere. This combination of technologies can be used in LIDAR and radar applications.

Technical Discussion of the Concept

Figure 2:
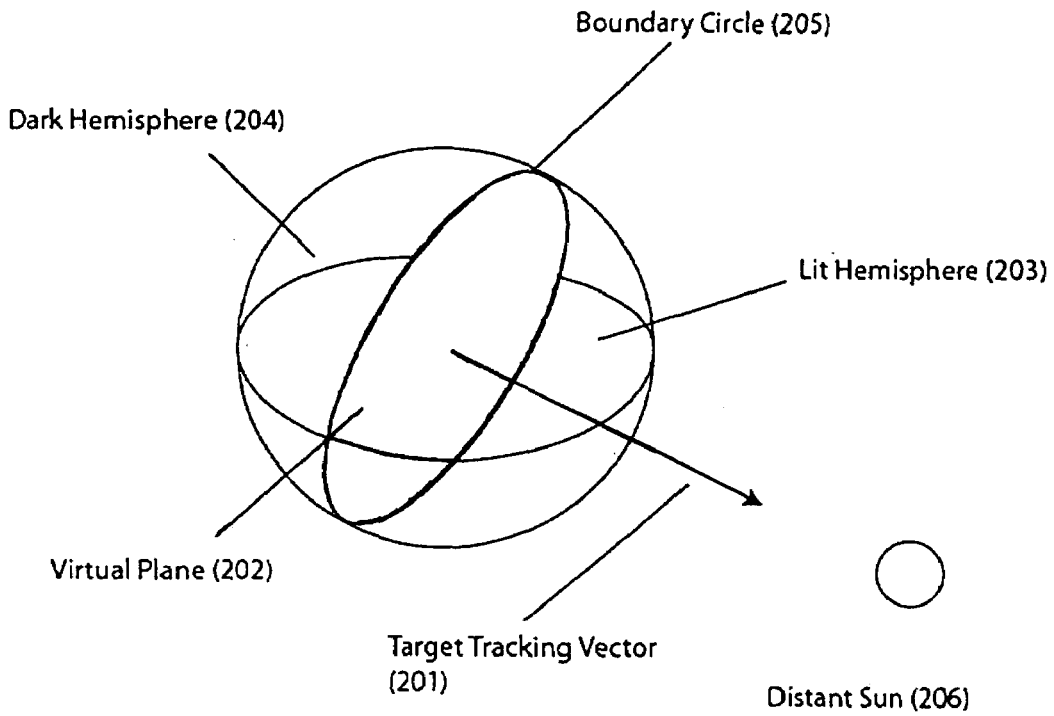
FIG. 2 is an illustration depicting the earth lit on one hemisphere by the sun. The figure shows the target tracking vector which is perpendicular to the virtual plane. The boundary circle around the sphere containing the virtual plane is also illustrated.

The invention concept is based on physical phenomena related to the transmission and reception of electromagnetic waves. A comparison to the earth-sun system best explains the underlining concept behind the innovation, shown in FIG. 2. In this model, the sun represents the transmitting source and the earth is analogous to the receiver. The sun emits visible light that illuminates one hemisphere of the earth at all times. Likewise, at any given moment, the other half of the earth is "dark". As a result, there exists a virtual plane characterized by the boundary circle between the "lit hemisphere" and the "dark hemisphere" on the earth. A vector perpendicular to this plane placed at the center of the earth points in the direction of the sun (visible light source). FIG. 2 shows the plane and accompanying perpendicular vector which can be determined with only three boundary points on the boundary circle.

Another way to characterize the plane is with two intersecting vectors determined by four boundary points. Once these two vectors ($V_1$, $V_2$) are determined, the perpendicular vector (target tracking vector $T_v$) can be calculated by taking the cross product of $V_1$ and $v_2$.

$$T_v = V_1 \times V_2 \tag{1}$$

The concept takes advantage of the spherical shape of the earth to find the direction of the sun by monitoring boundary points between the "lit hemisphere" and the "dark hemisphere". This concept is easily translated to locate any source emitting an electromagnetic signal. A spherical receiver, designed with strategically placed sensors, monitors the boundary points on the "lit hemisphere" (lit by various electromagnetic waves). The target tracking vector is then calculated to determine the location of various electromagnetic wave sources. This receiver can be fitted with a myriad of sensors to locate a full range of electromagnetic sources.

Figure 3:
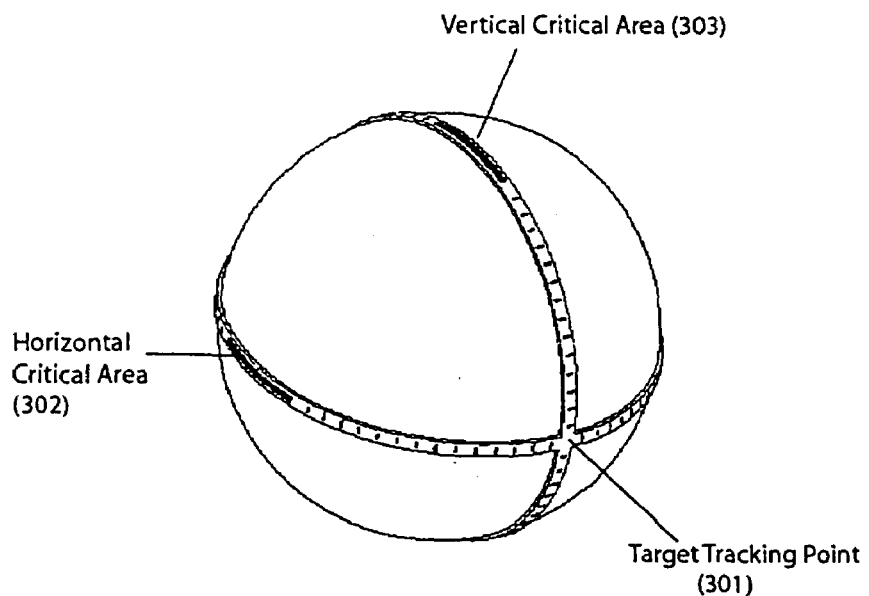
FIG. 3 is a preferred design of a focal plane array spherical receiver depicting the increased number of sensors in the critical areas allowing for precision angular turns. Also shown is the target tracking point used to determine the target tracking vector to locate targets.

The method of obtaining two vectors permits the placement of sensors in bands around a spherical insulator shown in FIG. 3. The bands are perpendicular to one another and intersect on two sides of the sphere. This configuration determines vertical and horizontal angles relative to the sphere where the source is present. A rotational system is integrated to rotate the spherical receiver in the horizontal and vertical directions.

Using the rotational mechanism, sensors are closely placed on critical areas of the sphere where the boundary circle is present FIG. 2. The rotational system generates a target tracking point on the sphere that will follow the target relative to the seeking vehicle.

A vector at the center of the spherical receiver through the target tracking point defines the target tracking vector. This vector can then be used to provide directions to various guidance systems. Given these angular directions and a magnitude of the incoming signal, the three dimensional location of a source is completely characterized.

Mathematical Methods and Accuracy

1. Horizontal Plane Accuracy

Figure 4:
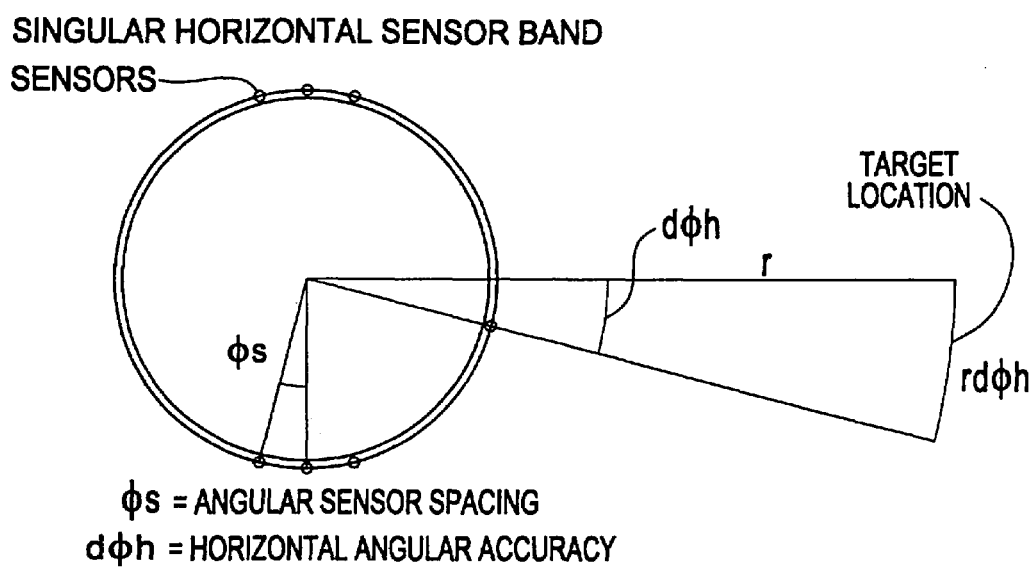
FIG. 4 is a diagram showing a singular horizontal sensor band of the spherical receiver depicting the angular sensor spacing and the associated horizontal angular accuracy.

The fundamental concept can first be explored in two dimensions for clarity. The explanation focuses on a single spherical sensor band FIG. 4. The sensors on the band are spaced by discrete angular turns ($\phi_s$). The angular sensor spacing ($\phi_s$) is directly proportional to the horizontal angular accuracy d $\phi_h$ of the receiver. The distance (r) from the target is determined by various signal measurements depending on the desired target's transmission or reflection properties. There is an associated spatial error dependant on the distance away from the target (r d$\phi_h$). This spatial error will decrease as the target is approached due to the decreasing magnitude of the radial vector r. This inherent feature of the concept provides superior interception capabilities.

2. Superposition of Sensor Band Accuracies

Figure 5:
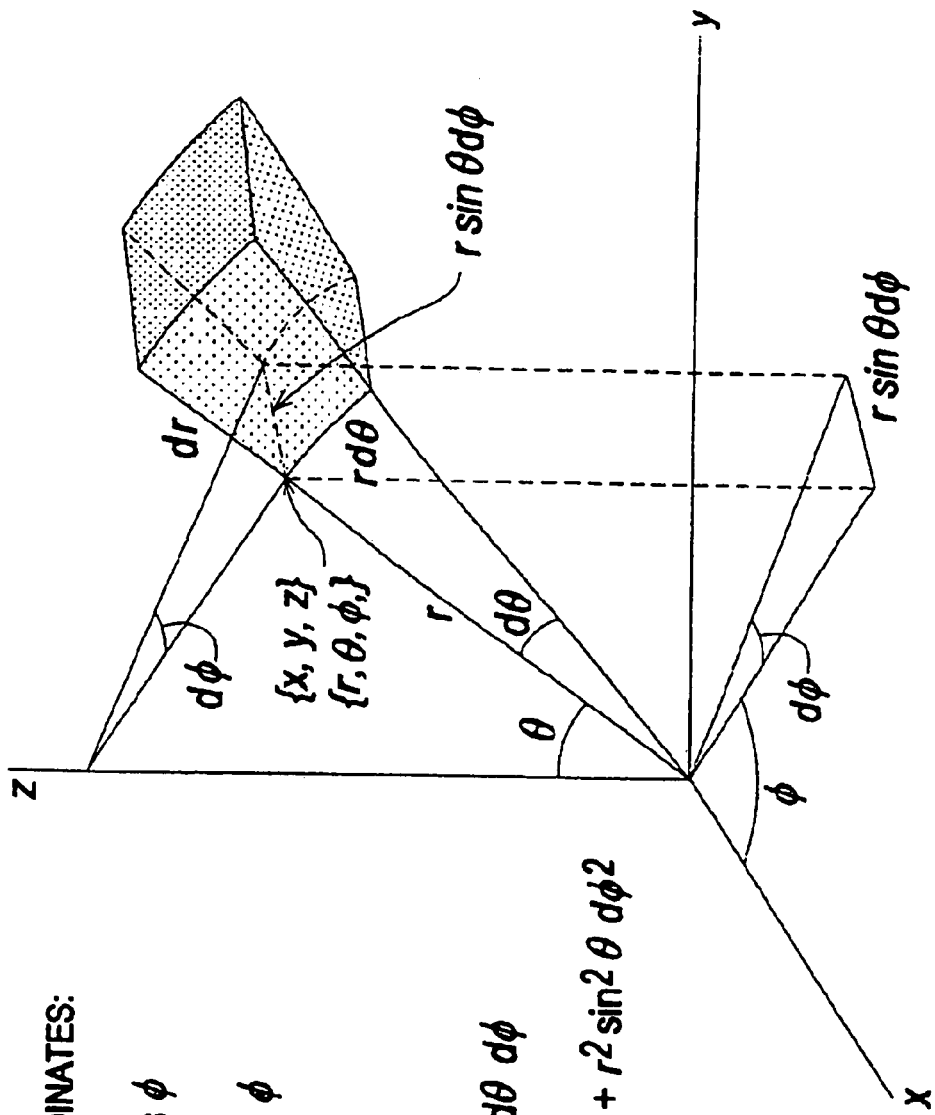
FIG. 5 is an illustration showing the equations for spherical coordinates with accompanying volume and line integral elements. Also shown is a three dimensional volume described by the angular accuracies dθ, dφ and the radial accuracy dr.
Figure 6:
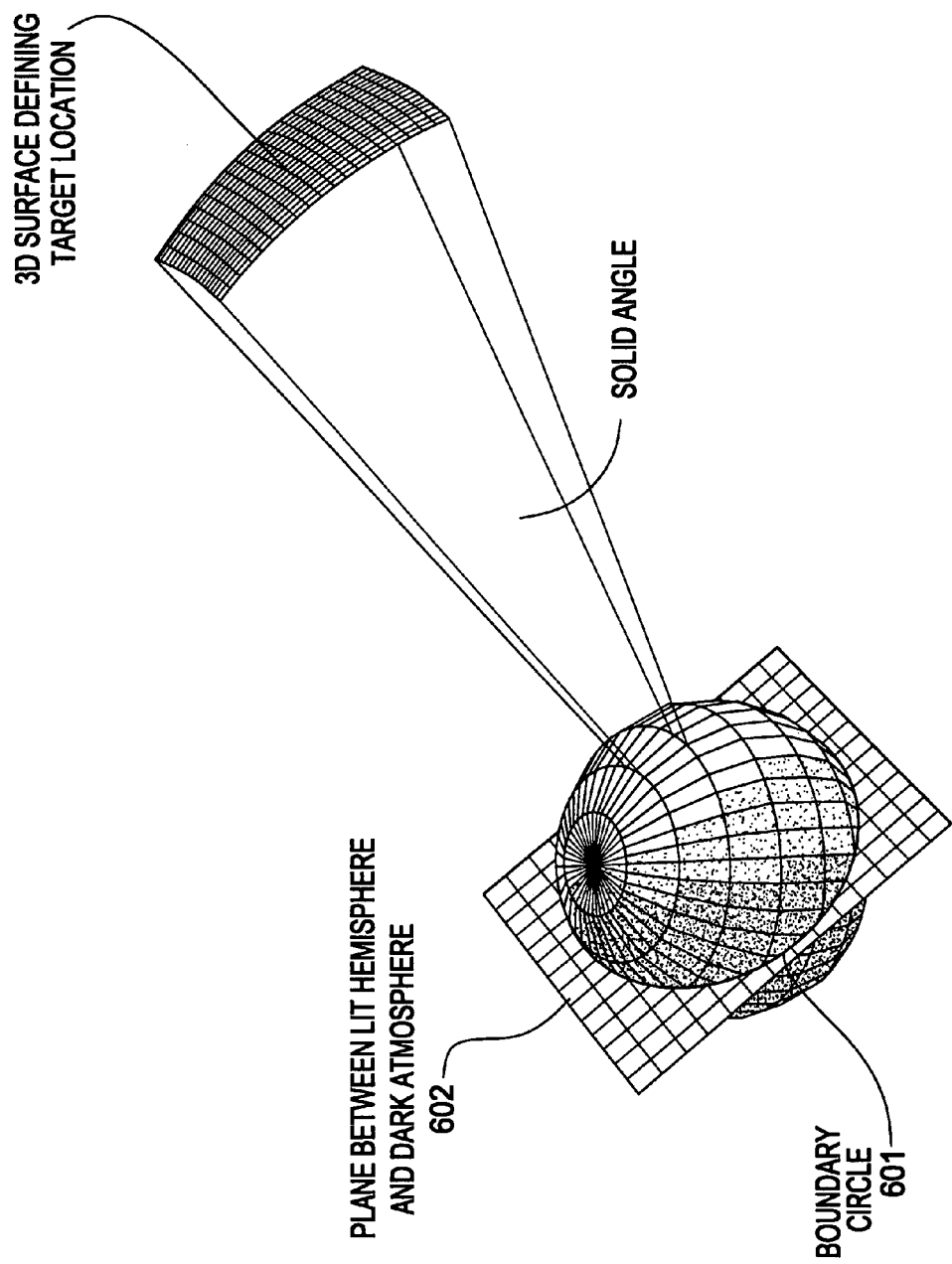
FIG. 6 is a diagram showing a spherical receiver with angular accuracy in three dimensions. It depicts the three dimensional surface where the target will be present with the associated solid angle. The diagram also illustrates the plane and boundary circle separating the lit hemisphere from the dark hemisphere.

The preceding analysis is then applied to a vertical sensor band with sensor spacing $\theta_s$. The vertical sensor band has an angular accuracy d $\theta_v$ proportional to the sensor spacing $\theta_s$. The superposition of the vertical and horizontal angles produces a solid angle in three dimensions FIG. 5 and FIG. 6. This solid angle is used to give directions to the seeking vehicle with accuracies d $\phi_h$ and d $\phi_v$ corresponding to the sensor spacings $\phi_s$ and $\theta_s$.

3. Spherical Coordinate System

Given the spherical nature of the receiver, a spherical coordinate system is established with the center of the spherical receiver at the origin. Vectors in this coordinate system have a magnitude (r) associated with the distance from the transmission source with angular coordinates in the vertical ($\theta$) and horizontal ($\phi$) directions as FIG. 5. The spherical vector coordinates (r, $\theta$, $\phi$) have associated small displacements (dr, d $\theta$, d$\phi$) used to perform mathematical manipulations in three dimensions. These displacements correlate to the accuracy of the system. The small displacement (dr) is proportional to the accuracy of the incoming signal measurement. The two angular displacements (d $\theta$ and d$\phi$) are proportional to the sensor spacing ($\theta_s$ and $\phi_s$) in the vertical and horizontal directions on the receiving sphere as described previously. The combination of dr, d$\theta$ and d$\phi$ create a volume element where the transmitter will be present FIG. 5. This volume element is described by a spherical vector (r, $\theta$, $\phi$) with an accuracy proportional to the sensor spacing ($\phi_s$, $\theta_s$) and the accuracy of the received signal dr. With this information, angular directions with an accompanying distance can be provided to locate the target in three dimensions. The information can also be translated into a Cartesian coordinate system to give distances in the x, y, and z axes relative to the receiver FIG. 5.

4. Accuracy Using the Rotational Mechanism

The accuracy of the device is determined by the spacing of sensors on the spherical bands. The sensors are arranged so that a precise angular turn ($\theta$s) exists between neighboring sensors. Each sensor has a corresponding sensor placed with 180° separation on the spherical band. As the received signal shifts from one sensor to its neighbor a similar behavior occurs on the opposite side of the sphere. This shifting between pairs of sensors equates to angular motion by the transmitter. The sensor spacing ($\theta_s$ and $\phi_s$) on the spherical sensor bands can be 0.5° apart to give angular directions to the user with 0.5° accuracy. This accuracy is further refined by using mathematical models and timing techniques depending on the incoming signal amplitude changes. Using a rotational device the accuracy is calculated by the spacing of sensors in the critical areas on the sphere FIG. 3. The sensor spacing ($\theta_s$) is concentrated in the critical areas to give the target tracking vector a high degree of accuracy. The rotational method allows for a fewer sensors on the spherical receiver, thus simplifying the signal processing and tracking algorithms.

5. Solid Angle and Three Dimensional Surface

In three dimensions the device cuts out a solid angle where a transmitter is present. This solid angle is determined by the sensor spacing ($\theta_s$) and ($\phi_s$) on the vertical and horizontal sensor bands. With a precise measurement of the intensity of the incoming wave, the device defines a three dimensional surface where the target will be present 2 FIG. 6. As the device approaches the transmitting source, the three dimensional surface decreases in size. This allows for precision tracking of transmitting or reflecting targets. The angular accuracies given are based simply on the receiving status of neighboring sensors. These accuracies are increased by monitoring the amplitude fall off of the sensors in the critical areas and applying various mathematical models and timing techniques.

Target Tracking Point

The target tracking point on the sphere provides a dynamic approach for transmitting or receiving electromagnetic waves. Using the invention methods, the target tracking point will perpetually follow the intended target. This technological feature will facilitate the positioning of imaging and beam generating systems within the spherical device which focus directly on the target. An imaging system, incorporated into the spherical device, will take images directly at the target as it travels in three-dimensional space. This system will provide detailed information to numerous guidance systems for superior target discrimination and interception.

In addition, the target tracking point will serve as a basis for beam steering technologies. A laser can be aligned within the spherical receiver to point in the direction of the target tracking vector. The sensors on the spherical receiver will then monitor the laser-generated heat signature. In addition, imaging systems can be embedded in the spherical receiver with the aperture at the target tracking point.

Similar to light wave imaging systems, radar guidance systems can take full advantage of the beam steering abilities of the spherical receiver. The target tracking point will emit radar waves in a focused beam directed at the intended target. The ability to focus the radar beam will greatly reduce the multi-path distortions arising from radar sweeps. Similar to the imaging system, the sensors on the spherical receiver will be tuned to receive the specific wavelengths emitted from the target tracking point.

Non-Hemispherical Illumination of Sphere

Many real world electromagnetic systems exist in which a perfect hemisphere of a spherical receiver will not be illuminated. There are three main areas of concern when detailing the nature of non-hemispherical illumination: EM radiation angle of incidence on the sphere; the wavelength of the EM source and wrapping effects; and large EM sources in close proximity.

The EM radiation angle of incidence will play a major role in applying the spherical receiver concept. EM radiation travels in waves with both sine and cosine components. Typically sensors respond to the sine component of the incoming wave. Sensors in the critical areas will be perpendicular or nearly perpendicular to the incoming sine component of the EM wave and may not receive a signal. The FOV of the sensor will play a role in determine the sensor characteristics in the critical areas. A sensor with a full 180° FOV will be ideal for use in the spherical sensor configuration.

Longer wavelength EM systems such as the radio frequency band may produce signals beyond the hemisphere due to wrapping effects. As the waves travel the cosine component of the wave can wrap beyond the hemispherical boundary and register on a sensor/antennae in the umbra region. The shape and placement of the antennae elements will be critical in designing the receiver to limit this effect. The antennae element should see a significant drop as it ceases to receive direct sine wave signals and only receives wrapping waves. Detailed measurements of wrapping waves will be taken in order to compensate for this effect.

In scenarios where large EM sources are present the illumination of more than a hemisphere will occur in close proximity. These systems will have dependencies on the size of the EM source and the distance from the receiver. In long range systems a large EM source can be approximated by a point source. However for interception applications the over-illumination of the sphere must be taken into account. Experimental setups can be designed with various EM source sizes to determine the effects of over-illumination of the sphere. This behavior can be incorporated into the algorithm development and included as a further measurement of object size and distance from the receiver.

Multiple Target Scenarios

Figure 11:
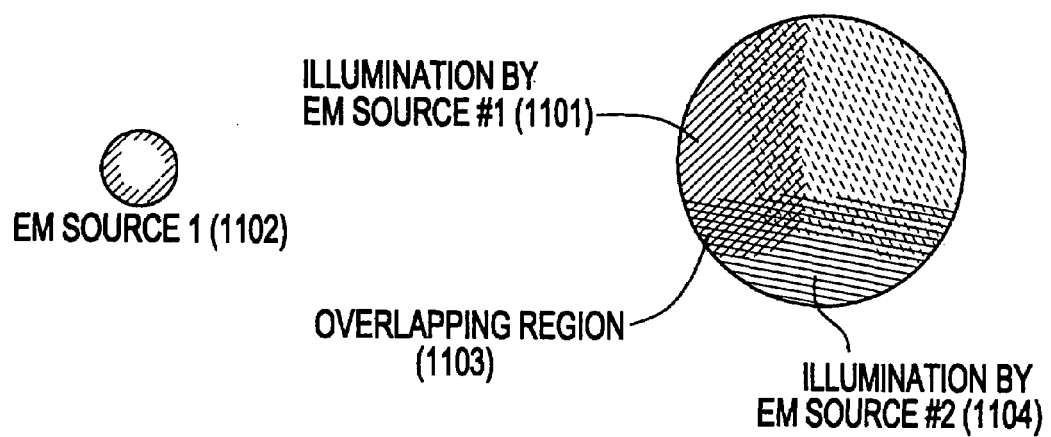
FIG. 11 shows a dual target scenario. The diagram depicts two EM sources of different visible wavelengths. Different regions on the spherical receiver receive different intensities of light from different sources. There exists three regions on the sphere due to the illumination by the different sources which include an overlapping region and two regions specific to the sources.
Figure 11:
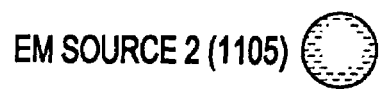

Many scenarios exist in which a spherical receiver will prove beneficial for multiple target analysis. The spherical receiver concept is founded on the determination of a boundary circle between an illuminated hemisphere and the associated umbra. Any three points on this boundary circle can serve to define the plane perpendicular to the direction of the EM source. Multiple EM sources will illuminate different hemispheres on the sphere and subsequently create different boundary circles. There are regions on the sphere where EM radiation will overlap as detailed in FIG. 11. Portions of the boundary circles exist which are unique to the EM source and can be used to locate the different sources. This phenomenon can be incorporated into the algorithm development to distinguish EM sources. The overlapping regions can also be characterized to provide more detailed analysis for target discrimination. A passive device can be designed with sensors covering an entire sphere to locate multiple EM sources in 3D. The accuracy of the device would be similarly dependant upon the sensor spacing as detailed above. In theory, the device would have the ability to distinguish targets separated by the same angular dimensions. Other spherical sensor configurations with multiple bands or other spherical sensor configurations can be explored depending on the application and number of targets.

Size of Sensor Configuration

The size of the spherical sensor configuration is calculated from the size of the sensor, the spacing on the sphere, and the desired accuracy. A first order approximation of the accuracy is given by the following equation:

$$\text{Angular Accuracy} = \sin^{-1}(d_{sensor}/r_{sphere}) \quad (2)$$

The necessary accuracy of the sensor system is dependant upon the application. Sensors produced by Judson Technologies have a viewing window of 9 mm which can be configured into a 10 cm radius device with a first order accuracy of 5.24 degrees. In addition, measuring the sensor response to angular turns and correlating sensors increases the accuracy of the device. Depending on the application a spherical receiver can be constructed to accommodate a wide range of accuracies.

Embodiment—3D Source Locator with Active Rotational System

Passive sensors in combination with the active rotational system of the device can be used to locate a wide range of electromagnetic wave sources. The device of FIG. 1 will be fitted with the necessary sensors or antennae to locate specific electromagnetic sources.

Process

Figure 7:
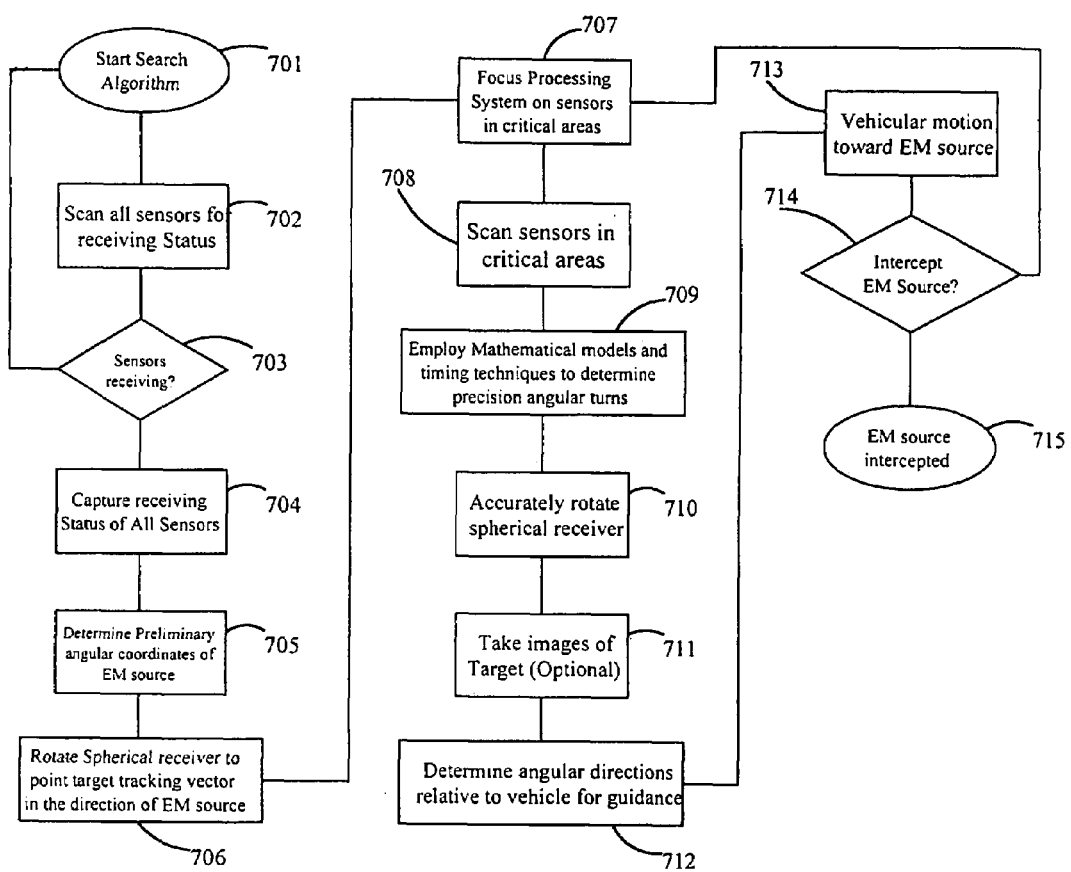
FIG. 7 is a flow diagram showing the process control used to search and intercept EM sources in 3-D.

The device will incorporate the processing system shown in FIG. 7. The process of locating EM sources in 3-D will begin with scanning all the sensors for receiving status 702. The scanning interval can vary depending on the application and sensor characteristics. As soon as one EM sensor receives a signal all other sensor receiving states will be captured 704. The receiving status of each sensor will be correlated to find a rough angular direction of the EM source 705. The rotational system will then be programmed to rotate the spherical receiver so that the target tracking vector is pointing in the direction of the transmitting source 706. The central processing system will then focus on the sensors in the critical areas 707. By monitoring the receiving status of the sensors in the critical areas precision angular turns will be calculated using mathematical models and timing techniques 708, 709. This information will be used to direct the rotational system of the spherical receiver to accurately point the target tracking vector in the direction of the EM source 710. With imaging systems incorporated into the system, images can be taken directly in the EM source 711. This information can then be used to direct the guidance system of the vehicle 712. Various methods can be used to give directions to the guidance system for a variety of purposes. For interception purposes, the process will continue looping until the EM source is intercepted 714, 715.

Systems that need to lock on a signal such as GPS or communication systems can benefit from the invention. The invention can lock onto an EM source (Communications) as a vehicle travels through 3D space. This system can be used for accurate wireless data transfer by pointing sensitive receivers directly at the EM source. The process will be similar to the system shown in FIG. 7 however vehicular motion toward source will not be essential.

Low Frequency Search and Rescue and Tracking Systems

The search and rescue industry currently employs radio frequency transmission and reception to locate people in distress. Using the invention concepts, a device can be designed to resolve multiple avalanche victims in three-dimensional space. This system can also be applied to other search and rescue and tracking applications incorporating different frequencies. These systems typically utilize lower RF frequencies for a multitude of applications including, avalanche and back-country rescue, marine rescue, animal tracking and aerial searching.

Wireless Communication and GPS Pointing Systems

Systems that utilize wireless communications such as cellular phones, GPS systems, and satellites, can take advantage of the antenna positioning capabilities of the device. The innovation dynamically follows radio frequency sources in three dimensions and facilitates the positioning of highly tuned receivers directly at the intended communication source. The method improves the reception capabilities of wireless communication devices and subsequently permits more reliable information transfer.

Embodiment—3D Transmit Receive Systems for Guidance Applications

Beam generating technologies such as a laser or active radar can be incorporated into the spherical receiving device. The processing of incoming signals and rotational system will enable beam generating technologies to be directed towards intended reflecting objects in 3-D space. For radar systems, radar beams can be directed at missiles, planes, and ground vehicles. These systems will use pulsed frequencies in the GHz range.

Laser guidance systems which generate infrared heat signatures on targets can also use the invention concepts. A laser aligned through the target tracking vector will perpetually follow a reflecting object. Sensors on the spherical receiver will receive the infrared waves that emanate from the heat signature.

Active Beams for Search and Intercept

Figure 8:
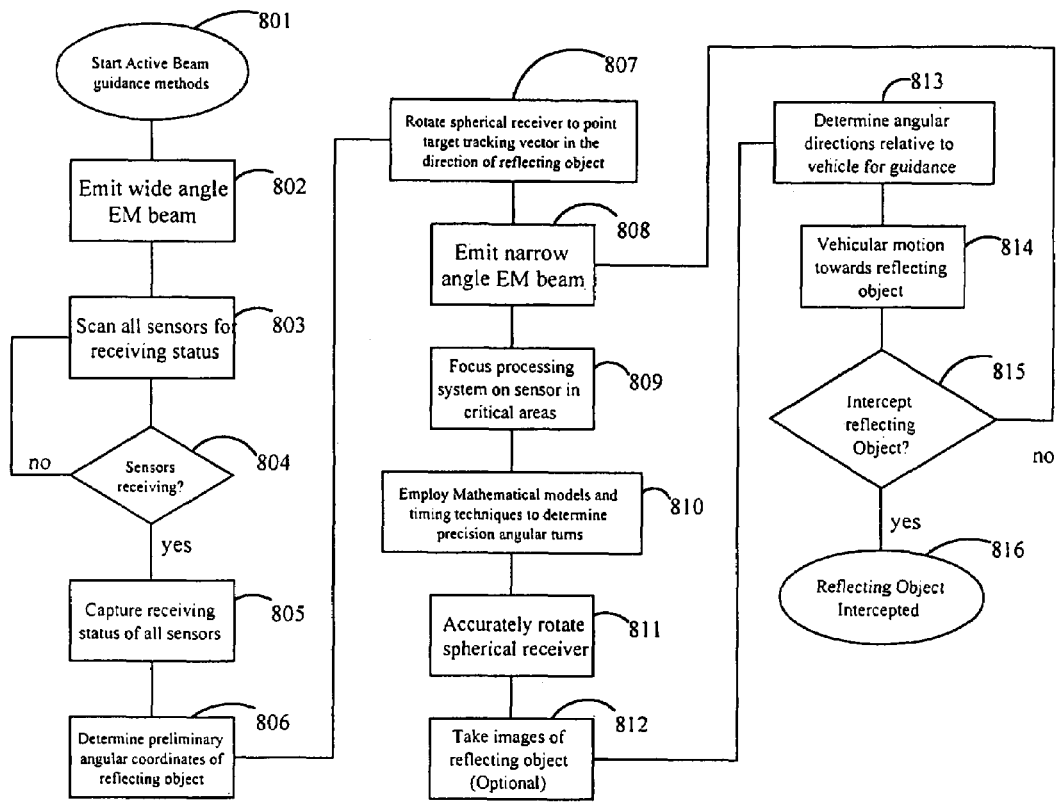
FIG. 8 is a flow diagram showing the process control used in active beam systems for locating and intercepting EM reflecting objects in 3D space.

The invention methods can also be used with an active EM beam generators aligned with the target tracking vector to locate reflecting objects in 3D. FIG. 8 shows the process of searching for EM reflecting objects in 3D using an active EM beam. The first step will be to emit a wide angle EM beam from the target tracking point on the spherical receiver 802. The process will then scan all the sensors on the spherical receiver to determine if o any reflected waves have returned 803. If no sensors receive a signal a wide angle pulse will be emitted again 804. If one sensor is found to receive a signal then all other sensors receiving status will be captured 805. The receiving status of each sensor will be correlated using the patent methods to find a rough angular direction of the EM reflecting object 805. The rotational system will then be programmed to rotate the spherical receiver so that the target tracking vector is pointing in the direction of the EM reflecting object 807. The active EM beam will emit a narrow pulse at the reflecting object 808. The central processing system will then focus on the sensors in the critical areas 809. By monitoring the receiving status of the sensors in the critical areas precision angular turns will be calculated using mathematical models and timing techniques 809, 810. This information will be used to direct the rotational system of the spherical receiver to accurately point the target tracking vector in the direction of the EM reflecting object 811. With imaging systems incorporated into the system, images can be taken directly in the EM reflecting object 812. This information can then be used to direct the guidance system of the vehicle 813. Various methods can be used to give directions to the guidance system for a variety of purposes. For interception purposes, the process will continue looping until the EM source is intercepted by vehicular motion 814, 815.

Radar Systems

Using the invention's concepts, a radar receiving sphere can be constructed to find the coordinates of both emitting and reflecting radar sources. Radar systems are used extensively for tracking and identification in a variety of applications. The device offers advanced beam steering capabilities that greatly reduce multi-path errors. More advanced radar systems impacted by the innovation are currently in use by missile guidance systems, aerial vehicle monitoring, and weather pattern monitoring.

Laser Guidance Systems

A laser source aligned through the target tracking vector will accurately focus on an enemy target. Focal plane array sensors (or other infrared sensors) on the spherical receiver will subsequently track the heat signature created by the laser. The spherical receiver and laser pointer, formulated into one device, will easily guide the laser and hence provide accurate directions to the target. Pulsed laser beams in combination with the focal plane array system can be used to mask the laser source.

Embodiment—3D Transmit Receive Scanning Systems

LIDAR systems using light wave frequencies can also be incorporated into the spherical receiving device. The system can emit various frequencies depending on the specific application. The receivers on the sphere will then collect waves returning from the reflecting object. Physical reflecting phenomenon such as Rayleigh and Raman scattering will be incorporated into the systems to determine the desired reflected wavelengths. In applications that search for specific gaseous particles, sensors will be used to receive the specific reflected frequency. The device will have the capability to scan various objects (including toxic, biological, and atmospheric) to find the size and density distribution. The size of the clouds will be derived by scanning and searching for boundary points where specific wavelengths (associated with reflecting particles) do not reflect back to the receiver. The density distribution of the cloud will be determined by monitoring the amplitude of the reflected signals. The source of a cloud can be potentially found by focusing on the area of highest reflection. Two scanning algorithms will be employed to locate and characterize EM reflecting objects. The first algorithm to find reflecting objects will use a wide angle EM beam with large angle rotations by the spherical receiver. The second algorithm will employ a narrow angle EM beam with small angular turns for object characterization. The Beam angle will be directly related to the angular motion in the scanning algorithms, both large and small angle.

Wide Angle Scanning Algorithm

Figure 9:
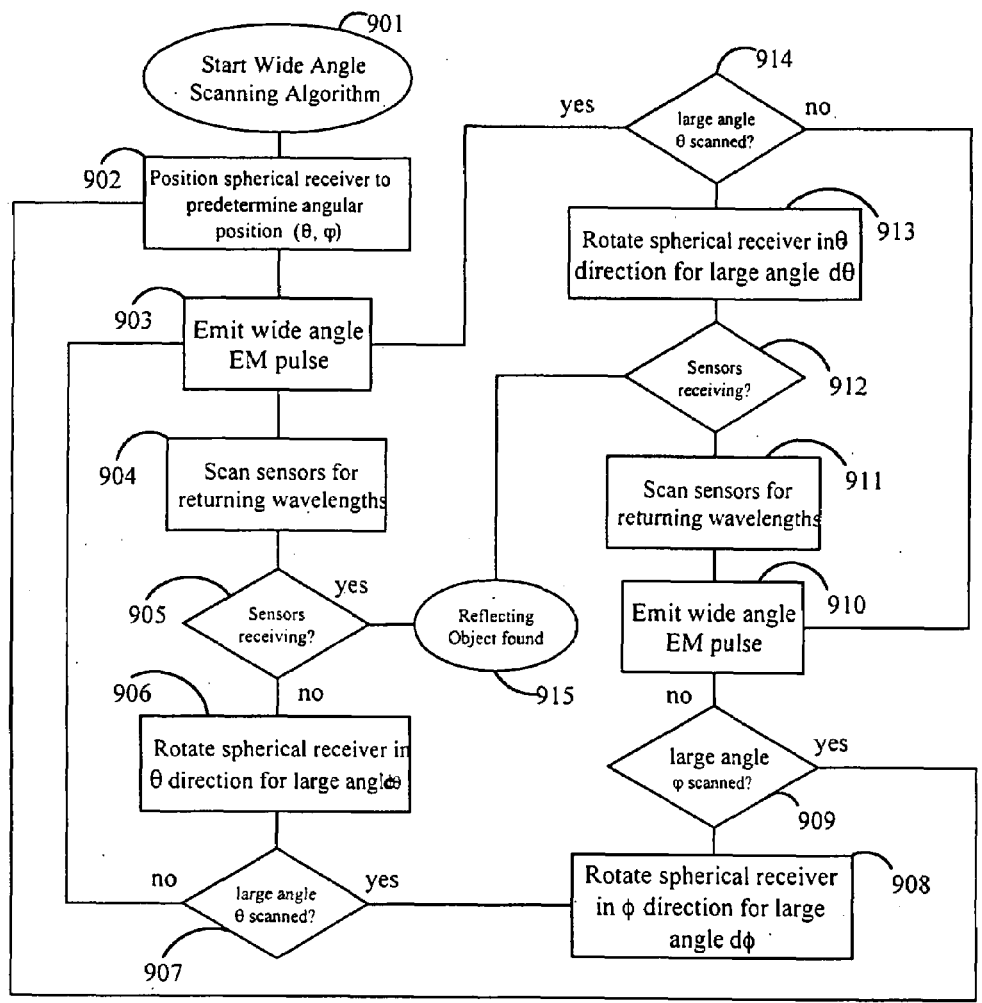
FIG. 9 is a flow diagram showing the process control used in active beam systems for searching 3D space for reflecting objects.

The process of scanning in three dimensions will begin with searching the surrounding three dimensional space for reflecting objects. An EM beam generator will be aligned along the target tracking vector of the receiving sphere, pointing out through the target tracking point. The EM beam generator will then emit specific EM wavelengths for use in various LIDAR and radar systems. The system will first use the Wide Angle Scanning Algorithm to find reflecting objects. FIG. 9 shows the process of scanning 3D space using the Wide Angle Scanning algorithm. The first step in the process will rotate the spherical receiver to a predetermined angular coordinate (θ, φ) 902. These preliminary angular coordinates will be determined given the specific application. The system will then emit a wide angle EM pulse to locate reflecting objects 903. The emitted light waves will encounter various mediums that reflect the light waves. Sensors on the spherical device will then be enabled to receive the reflected light waves. The sensors will be continuously monitored for receiving status 904. If one sensor receives a signal then all other signals will be captured and the wide angle scanning algorithm will end.

After the wide angle scanning algorithm has ended the algorithm will proceed to the small angle scanning algorithm. If no sensors are receiving a signal, the spherical receiver will rotate in the θ direction for a large angle dθ 906. The large angle dθ will be directly proportional to the wide angle EM pulse. The algorithm will then check to see if a predetermined angle θ (associated with the particular device field of regard and specific application) has been scanned 907. If the large angle θ has not been scanned the algorithm will return to step 903. Once the scan is complete in the θ direction, the algorithm will rotate the spherical receiver in the φ direction for a large angle φ 908. A control loop will check to determine if the large angle φ has been scanned 909. If the angle φ has been scanned (marking the end of the algorithm) the spherical receiver will return to the predetermined angular position (θ, φ) 902. An alternative method is to reverse the process to return to the original starting position. If the large angle φ has not been scanned, the algorithm will rotate the spherical receiver in the —φdirection to return to the φ start position. Once the angle in the —φdirection has been scanned the algorithm will again rotate in the θ direction 915. The process will return to scanning in the θ in step 903. At any point during the scanning if a signal is detected the large angle scanning algorithm will end 915 and rough angular coordinates will be calculated.

Small Angle Scanning Algorithm

Figure 10:
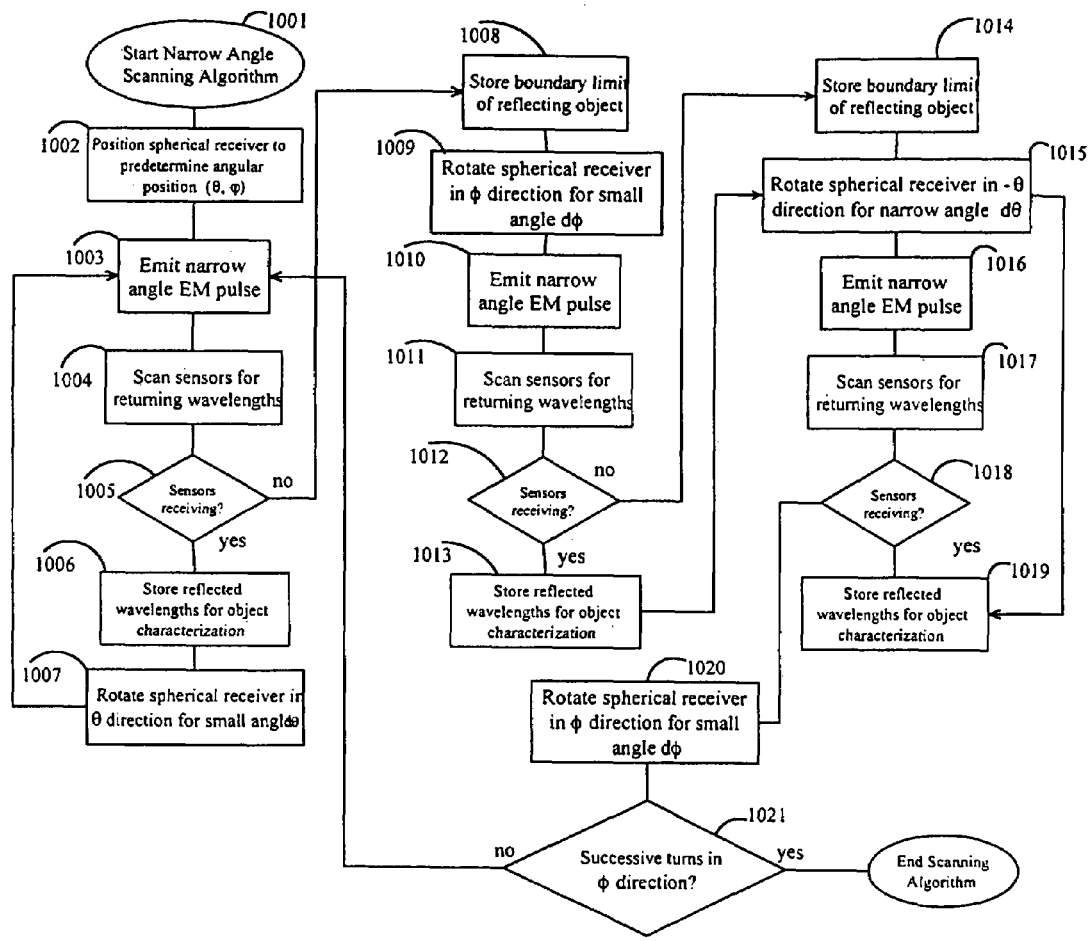
FIG. 10 is a flow diagram showing the process control used in active beam systems for reflecting object characterization.

Once a reflecting object is found using the large angle scanning algorithm, the small angle scanning algorithm is used to characterize a three dimensional object. FIG. 10 shows the process of scanning an object (cloud formations, aerial vehicle, ground vehicle) in three dimensions. An angular position of the reflecting object is provided by the large angle scanning algorithm to begin the object characterization 1002. The device will narrow the angle of EM beam generation to focus on specific object properties 1003. The sensors on the spherical receiver will be scanned to see if reflected wavelengths are returning. If the sensors are receiving, the information will be stored to characterize the object 1006. Various measurements of the returning EM waves can be taken and stored to determine properties of the reflecting object. The spherical receiver will then rotate in the θ direction a small angle d θ 1007 and return to step 1003. Similar to the large angle scanning algorithm, the small angular motions of the receiver will be directly proportional to the emitted beam. If the sensors cease to receive a signal the algorithm will store the angular position (θ, φ) as a boundary limit of the object 1008. The control program will then rotate the spherical receiver in the φ direction for a small angle d φ 1009. The algorithm will then emit another narrow angle pulse 1011. The control program will check to see if any of the sensors are receiving a signal 1012. If no sensors are receiving a signal the algorithm will store the boundary limit of the reflecting object 1014. If the sensors are receiving the reflected waves will be stored for object characterization. Both options from step 1012 will then rotate the spherical receiver in the —θ for a small angle d θ 1015. The control program will then emit a narrow angle EM pulse and scan the sensors for receiving status 1016, 1017. If the sensors are receiving a signal 1018, the program will store the reflected wavelengths for object characterization 1019 and return to step 1015. If the sensors cease to receive a signal the control program will rotate the spherical receiver in the φ direction 1020. A control loop will check to see if two successive angular rotations in the φ direction have occurred with no turns in the ? direction 1021. If two successive angular turns in the φ direction have occurred the program will end and the information will be collected into a model for further processing 1022. The algorithm assumes the (θ, φ) starting position marks the boundary of the object in the —θ direction. Other similar algorithms can be employed with various starting positions. Numerous variations on the scanning algorithms will be implemented depending on the desired applications.

Three Dimensional Scanning Capabilities and Toxic Cloud Analysis

Systems using LIDAR are currently being developed to detect toxic and biological hazardous particles in the atmosphere. The innovation has technological features that will benefit the current systems. The device will have the capability to scan toxic clouds to find the size and density distribution. The size of the clouds will be derived by scanning and searching for boundary points where specific wavelengths (associated with the toxic particle) do not reflect back to the receiver. The density distribution of the cloud will be determined by monitoring the amplitude of the reflected signals.

Monitoring Weather Patterns

Scanning algorithms, using spherically configured sensors, will map a three dimensional space for various wavelengths and amplitudes. LIDAR systems are currently used to monitor weather patterns in the LITE (Lidar Technology Experiment) and the GALE (Giant Aperture Lidar Experiment) programs. The technology has many features that will benefit these systems. The advanced geometrical structure of the device will serve as the foundation for entirely new signal collection and processing techniques. The device will have the capability to scan clouds to find the size and density distribution of the cloud. The size of the clouds will be derived by scanning the cloud and searching for boundary point where specific wavelengths (associated with the water, dust and other aerosols) do not reflect back to the receiver. The density distribution of the cloud will be determined by monitoring the amplitude of the reflected signal. This method can be employed to locate the source of dynamic activity in weather patterns (such as hurricanes, blizzards, and tornadoes) by focusing on areas high reflection.

Monitoring Ocean Currents and Other Phenomenon

Similar methods to scan cloud and storm formations can be used to monitor ocean currents. These methods using a LIDAR system will monitor ocean currents, temperatures, wave motion, ocean upwellings and tides. Using the innovation, LIDAR systems will be designed with advanced signal processing techniques to monitor dynamic activities of the ocean. Integration with current LIDAR technology will facilitate new systems for a wide range of ocean phenomenon studies. The innovation will be able to scan the areas of dense phytoplankton to provide more information for further behavioral studies such as the diurnal phenomena.

Monitoring Polar Ice Caps

The spherical sensor rotational system linked with LIDAR technology will be able to detect and map patterns in polar ice caps. Similar data collection methods used to monitor weather patterns and ocean phenomenon will be applied to the polar ice caps. The data obtained will reveal natural patterns such as ice flow velocity, density, thickness, and extent. This combination of data collection technology will be directly applicable to current research efforts underway in the Arctic and Antarctic regions by groups including INSTAAR.

Those skilled in the art will appreciate that various modifications to the exemplary embodiments are within the scope of the patent.

What is claimed is:

1. A method for detecting and locating a signal using a discrete three dimensional receiving element having multiple sensors surrounding the receiving element, the method comprising the steps of:
   detecting the signal with those sensors generally facing the signal;
   determining a boundary line around the surface of the receiving element, the boundary line generally separating sensors detecting the signal from sensors not detecting the signal;
   determining a plane through the receiving element based upon the boundary line;
   determining the direction of the signal based upon the plane; and
   transmitting data indicating the determined direction to a control system.

2. The method of claim 1 further including the steps of:
   measuring the strength of the detected signal with the sensors;
   computing the distance between the receiving element and a source of the signal based upon the measured signal strengths.

3. The method of claim 2 wherein the step of determining the boundary line is further based upon the measured signal strengths.

4. The method of claim 2, further comprising the step of generating a transmission based upon the determined direction and distance of the source of the signal.

5. The method of claim 4, wherein the step of generating a transmission comprises the step of transmitting the direction and distance of the source to a remote location.

6. The method of claim 4, wherein the step of generating a transmission comprises the step of directing an electromagnetic beam toward the source and detecting the electromagnetic beam impinging on the source.

7. The method of claim 6, wherein the electromagnetic beam reflects off of the source.

8. The method of claim 2 further including the step of rotating the receiving unit while the sensors are detecting the signal.

9. The method of claim 2 wherein the receiving unit has at least a portion of one of the following shapes: sphere, ellipsoid, circular band, cone, prism, pyramid, cone.

10. The method of claim 2 wherein the receiving unit is spherical and the sensors are placed in bands encircling the receiving unit.

11. The method of claim 2 wherein the sensors detect one of the following types of signals: radio frequency, microwave, infrared, visible light, ultraviolet, x-ray, gamma ray, radar, sonar, sound, particles, communication signals.

12. The method of claim 2, further comprising the step of detecting a second signal by finding a second boundary plane based upon regions of detected signal strength.

13. Apparatus for detecting and locating a signal comprising:
   a discrete three dimensional receiving element, the receiving element being an insulator with respect to the signal;
   multiple sensors surrounding the receiving element, wherein the sensors generally facing the signal detect the signal; and
   a processor including
   means for determining a boundary line around the surface of the receiving element, the boundary line generally separating sensors detecting the signal from sensors not detecting the signal,
   means for determining a plane through the receiving element based upon the boundary line, and
   means for determining the direction of the signal based upon the plane.

14. The apparatus of claim 13 wherein the sensors further measure the strength of the detected signal with the sensors and wherein the processor further includes means for computing the distance between the receiving element and a source of the signal based upon the measured signal strengths.

15. The apparatus of claim 14 wherein the means for determining the boundary line further utilizes the measured signal strengths.

16. The apparatus of claim 14, further comprising a transmitter for generating a transmission based upon the direction and distance to the source of the signal.

17. The apparatus of claim 16, wherein the transmitter transmits the direction and distance of the source to a remote location.

18. The apparatus of claim 17, wherein the transmitter transmits an electromagnetic beam toward the source, and further comprising a response detector for detecting a response based upon the electromagnetic beam impinging on the source.

19. The apparatus of claim 15 wherein the receiving element has at least a portion of one of the following shapes: sphere, ellipsoid, circular band, cone, prism, pyramid.

20. The apparatus of claim 15 wherein the receiving unit is spherical and the sensors are placed in bands encircling the receiving unit.

21. The apparatus of claim 15 wherein the sensors detect one of the following types of signals: radio frequency, microwave, infrared, visible light, ultraviolet, x-ray, gamma ray, radar, sonar, sound, particles, communication signals.

* * * * *

UNITED STATES PATENT AND TRADEMARK OFFICE
CERTIFICATE OF CORRECTION

PATENT NO.         : 7,277,053 B2                                        Page 1 of 1
APPLICATION NO. : 10/936428
DATED                : October 2, 2007
INVENTOR(S)        : Ryan D. Riel et al.

It is certified that error appears in the above-identified patent and that said Letters Patent is hereby corrected as shown below:

Column 1, Line 56, between "method" and "susceptible" insert --is--.

Column 2, Line 25, delete "on to" and insert --onto--.

Column 4, Line 20, delete "planes" and insert --plane--.

Column 4, Line 44, between "variety" and "applications" insert --of--.

Column 5, Line 19, delete "used" and insert --use--.

Column 6, Line 41, delete "underling" and insert --underlying--.

Column 6, Line 49, between "plane" and "placed" insert --is--.

Column 6, Line 58, delete "$v_2$" and insert --$V_2$--.

Column 8, Line 36, after "will be present" delete "2".

Column 9, Line 23, delete "determine" and insert --determining--.

Column 11, Line 43, after "be used with" delete "an".

Column 11, Line 50, after "to determine if" delete "0".

Signed and Sealed this

Fifteenth Day of April, 2008

JON W. DUDAS
*Director of the United States Patent and Trademark Office*